United States Patent
Yanoto

(10) Patent No.: US 10,280,864 B2
(45) Date of Patent: May 7, 2019

(54) CONTROL APPARATUS

(71) Applicant: DENSO CORPORATION, Kariya, Aichi-pref. (JP)

(72) Inventor: Keisuke Yanoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/567,736

(22) PCT Filed: Mar. 30, 2016

(86) PCT No.: PCT/JP2016/001828
§ 371 (c)(1),
(2) Date: Oct. 19, 2017

(87) PCT Pub. No.: WO2016/174820
PCT Pub. Date: Nov. 3, 2016

(65) Prior Publication Data
US 2018/0112618 A1    Apr. 26, 2018

(30) Foreign Application Priority Data
Apr. 27, 2015  (JP) .................................. 2015-89923

(51) Int. Cl.
*F02D 41/40* (2006.01)
*F02D 41/20* (2006.01)
(Continued)

(52) U.S. Cl.
CPC ................ *F02D 41/30* (2013.01); *F01L 9/04* (2013.01); *F02D 41/20* (2013.01); *F02D 41/401* (2013.01);
(Continued)

(58) Field of Classification Search
CPC .................. F02D 41/40; F02D 41/401; F02D 2041/2003; F02D 2041/2006;
(Continued)

(56) References Cited

U.S. PATENT DOCUMENTS 8,725,392 B2    5/2014  Bolz
2002/0189593 A1  12/2002  Yamakado et al.
(Continued)

FOREIGN PATENT DOCUMENTS

EP    2 546 499    1/2013
JP    1-106956    4/1989
(Continued)

OTHER PUBLICATIONS

International Search Report for PCT/JP2016/001828, dated Jun. 21, 2016, 4 pages.

*Primary Examiner* — Erick R Solis
(74) *Attorney, Agent, or Firm* — Nixon & Vanderhye P.C.

(57) ABSTRACT

A control apparatus, which controlling an operation of an injector provided to an internal combustion engine, includes: a voltage application unit applying a voltage raised to have a step-up target value to the injector to open the injector; a current measurement unit measuring a drive current supplied to the injector in response to an application of the voltage; and a calculator calculating a current difference value which indicates a difference between an actually-measured profile and a reference profile. The actually-measured profile indicates a time-variation in an actually-measured value of the drive current, and the reference profile is a profile set in advance. The step-up target value is corrected according to the current difference value that is calculated.

4 Claims, 12 Drawing Sheets

(51) Int. Cl.
*F02D 41/30* (2006.01)
*F01L 9/04* (2006.01)
*F16K 31/06* (2006.01)
*H01F 7/18* (2006.01)

(52) U.S. Cl.
CPC ............... *F16K 31/06* (2013.01); *H01F 7/18* (2013.01); *F02D 2041/2003* (2013.01); *F02D 2041/2013* (2013.01); *F02D 2041/2027* (2013.01); *F02D 2041/2034* (2013.01); *F02D 2041/2051* (2013.01); *F02D 2041/2058* (2013.01); *F02D 2200/06* (2013.01)

(58) Field of Classification Search
CPC ....... F02D 2041/201; F02D 2041/2013; F02D 2041/2034; F02D 2041/2051; F02D 2041/2058
USPC .................................................. 701/104, 105
See application file for complete search history.

(56) References Cited

U.S. PATENT DOCUMENTS

| | | | |
|---|---|---|---|
| 2011/0220067 A1 | 9/2011 | Okonogi et al. | |
| 2013/0269800 A1* | 10/2013 | Fromont | G01M 13/00 137/565.16 |
| 2015/0108238 A1* | 4/2015 | Grandi | F02D 41/221 239/5 |
| 2015/0114099 A1* | 4/2015 | Qiao | F02D 41/20 73/114.49 |
| 2015/0144109 A1 | 5/2015 | Mukaihara et al. | |
| 2016/0319763 A1* | 11/2016 | Shen | F02D 41/20 |
| 2017/0009697 A1* | 1/2017 | Anetsberger | F02M 63/0052 |
| 2017/0114746 A1* | 4/2017 | Denk | F02D 41/2467 |

FOREIGN PATENT DOCUMENTS

| | | |
|---|---|---|
| JP | 5-6111 | 1/1993 |
| JP | 09-314299 | 12/1997 |
| JP | 2000-170949 | 6/2000 |
| JP | 2006-079544 | 3/2006 |
| JP | 2008-231939 | 10/2008 |
| JP | 2012-013098 | 1/2012 |
| JP | 2013-073944 | 4/2013 |
| WO | WO 2013/007560 | 1/2013 |
| WO | WO 2015/182042 | 12/2015 |
| WO | WO 2016/051755 | 4/2016 |

* cited by examiner

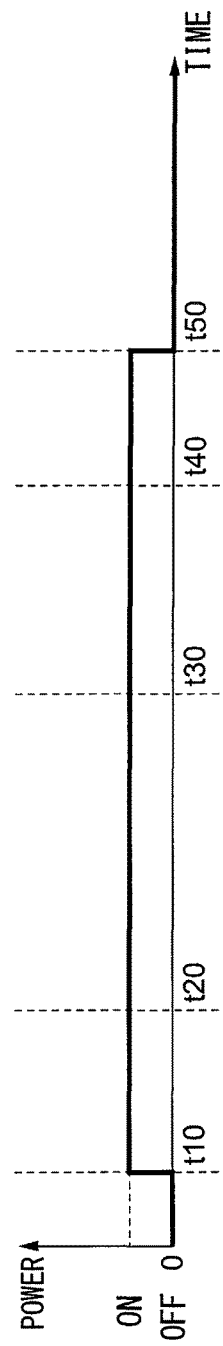
FIG. 2A
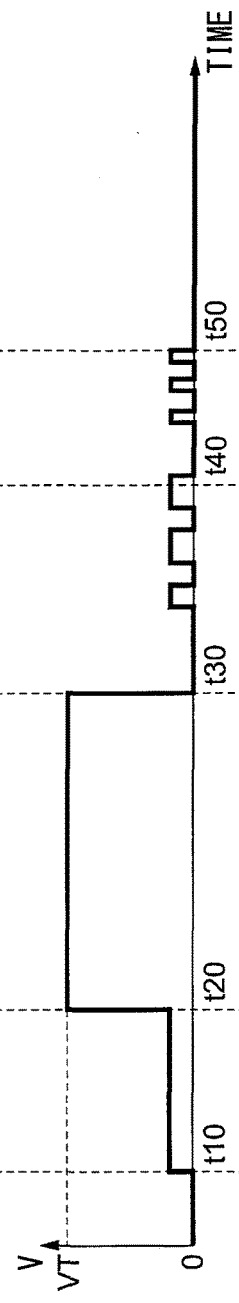
FIG. 2B
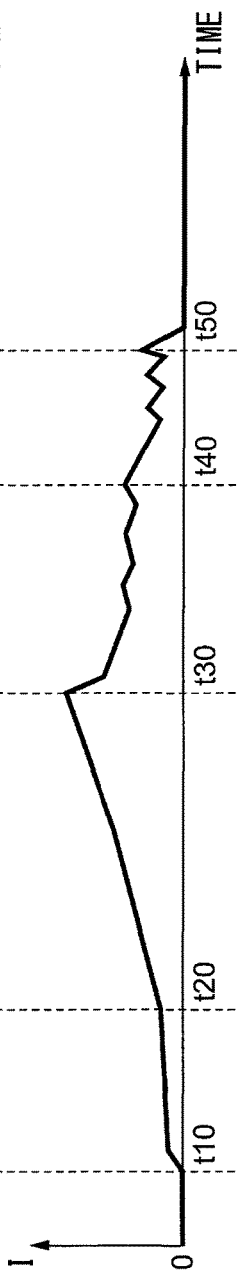
FIG. 2C
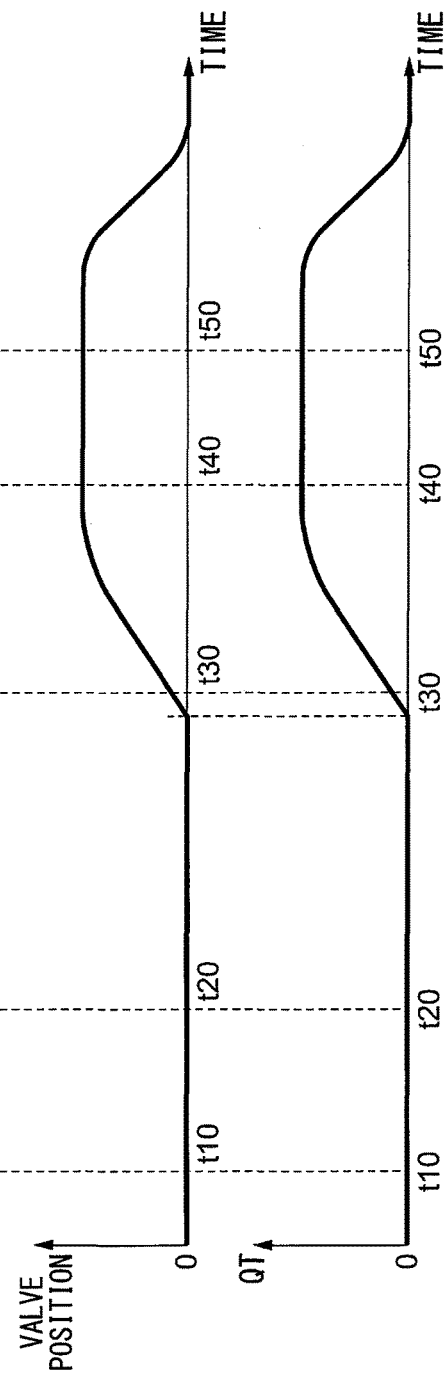
FIG. 2D
FIG. 2E

CONTROL APPARATUS

CROSS REFERENCE TO RELATED APPLICATION

This application is the U.S. national phase of the International Application No. PCT/JP2016/001826 filed Mar. 30, 2016, which designated the U.S. and claims priority to Japanese Patent Application No. 2015-089923 filed on Apr. 27, 2015, the entire contents of each of which are hereby incorporated herein by reference.

TECHNICAL FIELD

The present disclosure relates to a control apparatus controlling an operation of an injector provided to an internal combustion engine.

BACKGROUND ART

An injector provided to an internal combustion engine is an electromagnetic valve switched between open and close states by moving a valve body inside a cylinder. When a voltage is applied to the injector and a drive current flows to a coil, the valve body moves due to an electromagnetic force. The injector is thus switched to an open state and fuel is injected to the internal combustion engine.

To inject fuel supplied from the injector in a quantity coinciding with a target value (required injection quantity), it is necessary to appropriately control a time-variation in drive current flowing to the injector, that is, a current profile. However, the current profile may vary with, for example, a variance in electrical resistance across the coil of the injector or in magnitude of an applied voltage. When the current profile varies, a behavior of the valve body of the injector varies, too. An actual injection quantity thus deviates from the target value.

In particular, when the target value of an injection quantity is small, a variance in current profile gives a considerable influence. A variance in current profile as above may possibly occur due to a difference from injector to injector and a temperature change of the injector. A variance in current profile may also occur due to deterioration of the injector.

Patent Literature 1 specified below describes a control apparatus capable of limiting a deviation of an injection quantity caused by a variance in current profile by correcting a voltage application duration to the injector or a target value (maximum value) of a drive current.

PRIOR ART LITERATURES

Patent Literature

Patent Literature 1: JP 2014-5740 A

SUMMARY OF INVENTION

A correction method of the control apparatus described in Patent Literature 1 specified above, however, is not a method to bring an actual current profile close to a reference current profile. Hence, a behavior of the valve body in the injector differs from a reference behavior. That is, the control apparatus adopting the correction method as above is capable of bringing a final injection quantity in a single injection close to the target value, but incapable of bringing a time-variation in injection quantity in a single injection close to a reference time-variation.

In order to more appropriately inject fuel to the internal combustion engine, it is desirable to make a correction so as to bring an actual current profile close to the reference current profile to an extent possible for the valve body to behave in the injector in accordance with the reference behavior (that is, controlling a time-variation in injection quantity to coincide with the reference time-variation).

In view of the foregoing difficulties, it is an object of the present disclosure to provide a control apparatus capable of controlling an injector to inject fuel appropriately even when the injector deteriorates.

According to an aspect of the present disclosure, a control apparatus, which controlling an operation of an injector provided to an internal combustion engine, includes: a voltage application unit applying a voltage raised to have a step-up target value to the injector to open the injector; a current measurement unit measuring a drive current supplied to the injector in response to an application of the voltage; and a calculator calculating a current difference value which indicates a difference between an actually-measured profile and a reference profile. The actually-measured profile indicates a time-variation in an actually-measured value of the drive current, and the reference profile is a profile set in advance. The step-up target value is corrected according to the current difference value that is calculated.

According to the control apparatus configured as above, a change rate of the drive current is adjusted by correcting the step-up target value. The actually-measured profile is thus brought close to the reference profile.

Hence, instead of merely bringing a final injection quantity into coincidence with the target injection quantity, a time-variation in injection quantity in each injection can be brought close to a reference time-variation. Consequently, fuel can be injected from the injector more appropriately.

Hence, the present disclosure provides a control apparatus capable of controlling an injector to inject fuel appropriately even when the injector deteriorates.

BRIEF DESCRIPTION OF DRAWINGS

The above and other objects, features and advantages of the present invention will become more apparent from the following detailed description made with reference to the accompanying drawings. In the drawings:

FIG. 2A to FIG. 2E show graphs of variances in drive current and other factors when fuel is injected from an injector;

EMBODIMENTS FOR CARRYING OUT INVENTION

Figure 1:
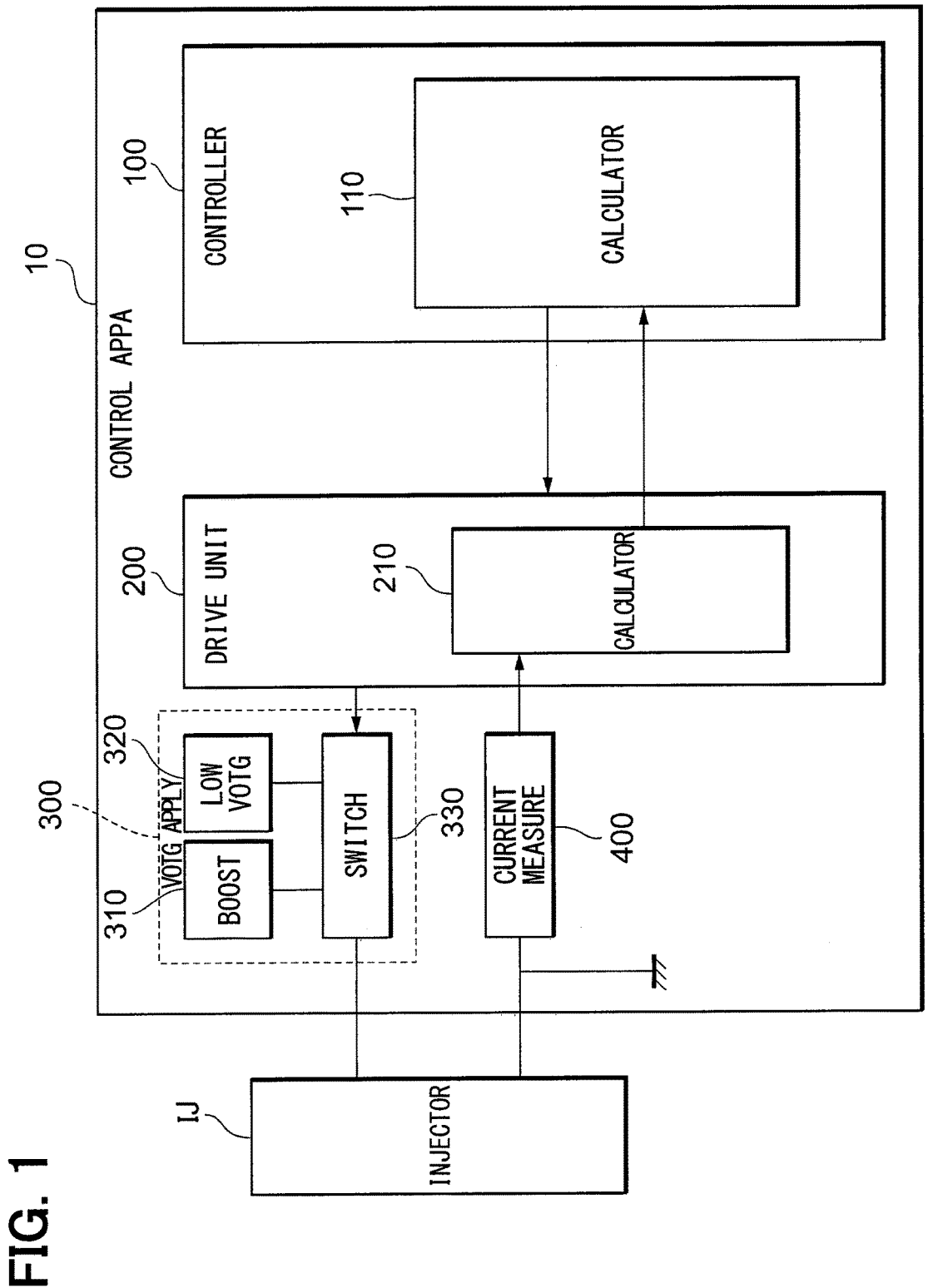
FIG. 1 is a view schematically showing a configuration of a control apparatus according to an embodiment of the present disclosure.

Hereinafter, an embodiment of the present disclosure will be described with reference to the accompanying drawings. For ease of understanding, same components in respective drawings are labeled with same reference symbols where appropriate and a description is not repeated herein.

A control apparatus (CONTROL APPA) 10 according to an embodiment of the present disclosure is an electronic controller (ECU) to control an operation of an injector IJ provided to an internal combustion engine of a vehicle (not shown). The injector IJ is an on-off valve from which to inject fuel into a cylinder of the internal combustion engine. The injector IJ is supplied with pressurized fuel from an unillustrated fuel pump. When the injector IJ is switched to an open state, fuel in a quantity corresponding to an opening degree is injected into the cylinder.

The injector IJ includes a valve body (needle) and a coil inside (neither is shown). When a voltage is applied to the injector IJ from the control apparatus 10 and a current flows to the coil, the valve body receives an electromagnetic force generated by the coil and moves inside the injector D. In the following description, a voltage applied to the injector IJ from the control apparatus 10 is referred to also as "a drive voltage". A current flowing to the coil of the injector IJ is referred to also as "a drive current".

The control apparatus 10 has a controller (CONTROLLER) 100, a drive unit (DRIVE UNIT) 200, a voltage application unit (VOTG APPLY) 300, and a current measurement unit (CURRENT MEASURE) 400.

The controller 100 is a micro-computer including a CPU, a ROM, a RAM, an I/O interface, and so on, and controls an overall operation of the control apparatus 10. The controller 100 has a calculator (CALCULATOR) 110 as a functional control block. The calculator 110 calculates a step-up target value, which is a target value of a drive voltage. A concrete content of a calculation performed by the calculator 110 will be described below.

The drive unit 200 is an IC performing a process to actually drive the injector D. The drive unit 200 controls an operation of the voltage application unit 300 according to the step-up target value calculated by the calculator 110.

The drive unit 200 has a calculator (CALCULATOR) 210. The calculator 210 calculates a current difference value described below according to a value of a drive current inputted from the current measurement unit 400 described below. The calculated current difference value is outputted to the calculator 110. A concrete content of a calculation performed by the calculator 210 will also be described below.

The voltage application unit 300 is a power-supply circuit to apply a drive voltage to the injector D. The voltage application unit 300 has a boosted power supply unit (BOOST) 310, a low-voltage power supply unit (LOW VOTG) 320, and a switching unit (SWITCH) 330.

The boosted power supply unit 310 is formed as a power transformer. The boosted power supply unit 310 is capable of outputting a high voltage by raising a voltage of a battery (not shown) provided to the vehicle. Magnitude of a voltage outputted from the boosted power supply unit 310 coincides with the step-up target value by a control performed by the drive unit 200.

The low-voltage power supply unit 320 outputs power supplied from the battery (not shown) provided to the vehicle without raising the voltage (as a low voltage).

The switching unit 330 is a switch to make switching between a state in which a high voltage from the boosted power supply unit 310 is supplied to the injector IJ as the drive voltage and a state in which a low voltage from the low-voltage power supply unit 320 is supplied to the injector IJ as the drive voltage. The switching unit 330 is also capable of making switching between application and interruption of the drive voltage to the injector D. An operation of the switching unit 330 is controlled by the drive unit 200.

The current measurement unit 400 is a sensor measuring a value of the drive current supplied to the injector IJ (flowing through the coil). The value of the drive current measured in the current measurement unit 400 is inputted into the calculator 210.

An example of variances in drive current and other factors when fuel is injected from the injector IJ will now be described with reference to FIG. 2A to FIG. 2E. FIG. 2A shows a graph of a variance in signal indicating a power supply state of the injector IJ, that is, a variance in power supply pulse. FIG. 2A to FIG. 2E shows an example where a drive voltage is applied to drive the injector IJ in a period from a time point t10 to a time point t50.

FIG. 2B shows a graph of a time-variation in drive voltage (V) applied to the injector D. FIG. 2C shows a graph of a time-variation in drive current (I) flowing through the coil of the injector D. FIG. 2D shows a graph of a variance in position of the valve body in the injector D. In FIG. 2D, a position 0 is a position of the valve body when the injector IJ is closed. FIG. 2E shows a graph of a variance in injection quantity (QT) of fuel from the injector D.

In the example shown in FIG. 2A to FIG. 2E, an application of the drive voltage starts at the time point t10 first. When the drive voltage application is started, a drive voltage is supplied from the low-voltage power supply unit 320 and a value of the drive voltage is relatively low. Energy to open the injector IJ is accumulated in a period from the time point t10 to a time point t20 by applying the low drive voltage in advance. The period from the time point t10 to the time point t20 is a preparing period (pre-charge phase) to open the injector IJ smoothly later. Alternatively, it may be configured so as to apply a high voltage to the injector IJ from a start without setting the pre-charge phase.

A drive current flows to the coil of the injector IJ at and after the time point t10. Hence, the valve body of the injector IJ receives an electromagnetic force in an opening direction. However, a pressure of fuel (fuel pressure) in the injector IJ is relatively high and the valve body is also receiving a force of the fuel pressure in a closing direction. Hence, a movement of the valve body is not started yet (FIG. 2D). Because the valve body remains at the closing position, fuel is not injected, either (FIG. 2E).

The switching unit 330 makes switching at and after the time point t20. Accordingly, an application of a drive voltage to the injector IJ from the boosted power supply unit 310 is started. Hence, a value of the drive voltage increases (FIG. 2B) and a value of the drive current increases at a higher rate (FIG. 2C). In such a period (boosting drive phase), magnitude of the electromagnetic force acting on the valve body increases and approaches magnitude of a force of the fuel pressure. In FIG. 2B, a value VT indicates a value of the drive voltage in the boosting drive phase, that is, the step-up target value.

When magnitude of an electromagnetic force exceeds magnitude of a force of the fuel pressure, the valve body starts to move in the opening direction (FIG. 2D), and injection of fuel is started, too (FIG. 2E). The boosting drive phase is ended (at time point t30) immediately after the valve body starts to move, and a value of the drive voltage is reset to 0.

Once the valve body of the injection IJ starts to move, a value of the drive current necessary for further movement of the valve body becomes relatively small. Hence, the switching unit 330 makes switching to apply the drive voltage to the injector IJ from the low-voltage power supply unit 320 at and after the time point t30. It should be appreciated, however, that the drive voltage is not applied continuously but intermittently in the form of a rectangular waveform. In such a period (hold phase), the valve body moves in the opening direction and stops at a target opening position (FIG. 2D) while a value of the drive current is decreasing (of FIG. 2C). Accordingly, injection of fuel is continued (FIG. 2E).

In the hold phase during which the drive voltage is applied intermittently, that is, a period from the time point t30 to the time point t50, a duty of the rectangular-wave drive voltage is not constant and adjusted as needed. In the example of FIG. 2A to FIG. 2E, when the valve body reaches substantially the target position, the duty after the time point t40 is adjusted to be smaller than the duty at and before the time point t40 (FIG. 2B).

Figure 3A:
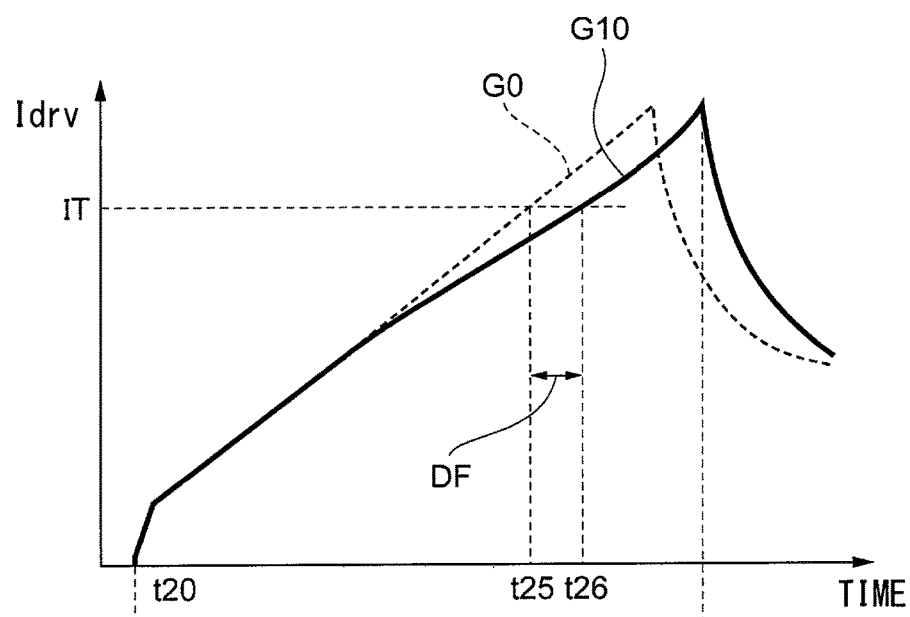
FIG. 3A to FIG. 3B show graphs of variances in drive current and drive voltage.

A time-variation in drive current (Idrv) during the boosting drive phase will now be described with reference to FIG. 3A to FIG. 3B. A line G10 in FIG. 3A is a graph of an example of a time-variation in actually-measured value of the drive current. Hereinafter, such a time-variation in actually-measured value of the drive current will be referred to also as an actually-measured profile.

A line G0 in FIG. 3A is a graph of a reference time-variation in drive current. Hereinafter, such a time-variation used as the reference will be referred to also as a reference profile. The reference profile is set in advance as a reference in accordance with an ideal amount of fuel to be injected, and pre-stored in the control apparatus 10.

Figure 3B:
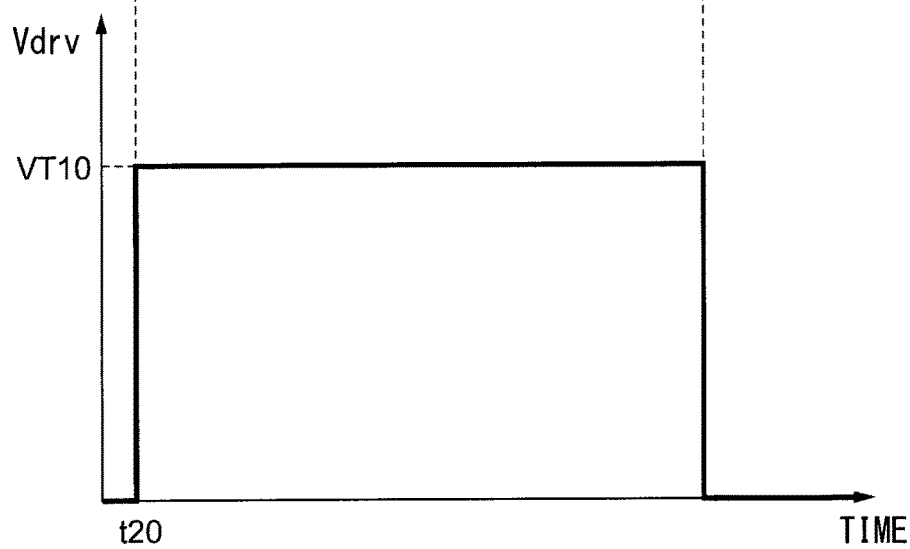

FIG. 3B shows a graph of a variance in drive voltage (Vdrv) being applied to the injector IJ when the drive current varies as the line G10. In FIG. 3B, a value VT10 is given as a value of the drive voltage, that is, the step-up target value.

In an example of FIG. 3A and FIG. 3B, the pre-charge phase as shown in FIG. 2B and FIG. 2C is not set for ease of description and a high voltage is applied from the start (at time point t20). The same applies to examples of FIG. 4A to FIG. 5B and FIG. 7A to FIG. 9B referred to in the description below.

As is shown in FIG. 3A, the actually-measured profile indicated by the line G10 and the reference profile indicated by the line G0 do not coincide with each other. Such a discrepancy arises from a variance in electrical resistance across the coil of the injector IJ, a temperature of the injector IJ, deterioration of the injector IJ, and so on.

Once a discrepancy is generated between the actually-measured profile and the reference profile, an injection quantity of fuel no longer coincides with a required injection quantity. Hence, the internal combustion engine may no longer operate properly. In order to eliminate such an inconvenience, process to bring the actually-measured profile close to the reference profile is performed in the present embodiment by correcting the step-up target value.

The following will describe a concrete content of such process. In the present embodiment, a predetermined threshold IT is set for the drive current (see FIG. 3A. The calculator 210 in the control apparatus 10 measures a duration (hereinafter, referred to also as "a voltage rising duration") taken until the drive current exceeds the threshold IT from a time point (time point t20) when the boosting drive phase has started for each injection of fuel from the injector.

The calculator 210 calculates a current difference value DF by subtracting a value of the voltage rising duration in the reference profile from an actually-measured value of the voltage rising duration. For example, in the actually-measured profile (line G10) in FIG. 3A, the drive current exceeds the threshold IT at a time point t26 whereas the drive current exceeds the threshold IT at a time point t25 in the reference profile (line G0). A length of a period from the time point t25 to the time point t26 is calculated as the current difference value DF.

The calculated current difference value DF becomes larger as a difference between the actually-measured profile representing a time-variation in actually-measured value of the drive current and the pre-set reference profile increases. Hence, the current difference value DF serves as an index indicating the difference and has a value indicating a degree of deviation of the actually-measured profile.

The current difference value DF calculated by the calculator 210 is inputted into the calculator 110 of the controller 100. The calculator corrects the step-up target value to make an absolute value of the current difference value DF is reduced. In the example of FIG. 3A and FIG. 3B, the step-up target value is corrected to be larger than the value VT10 to increase a gradient of the actually-measured profile.

Figure 6:
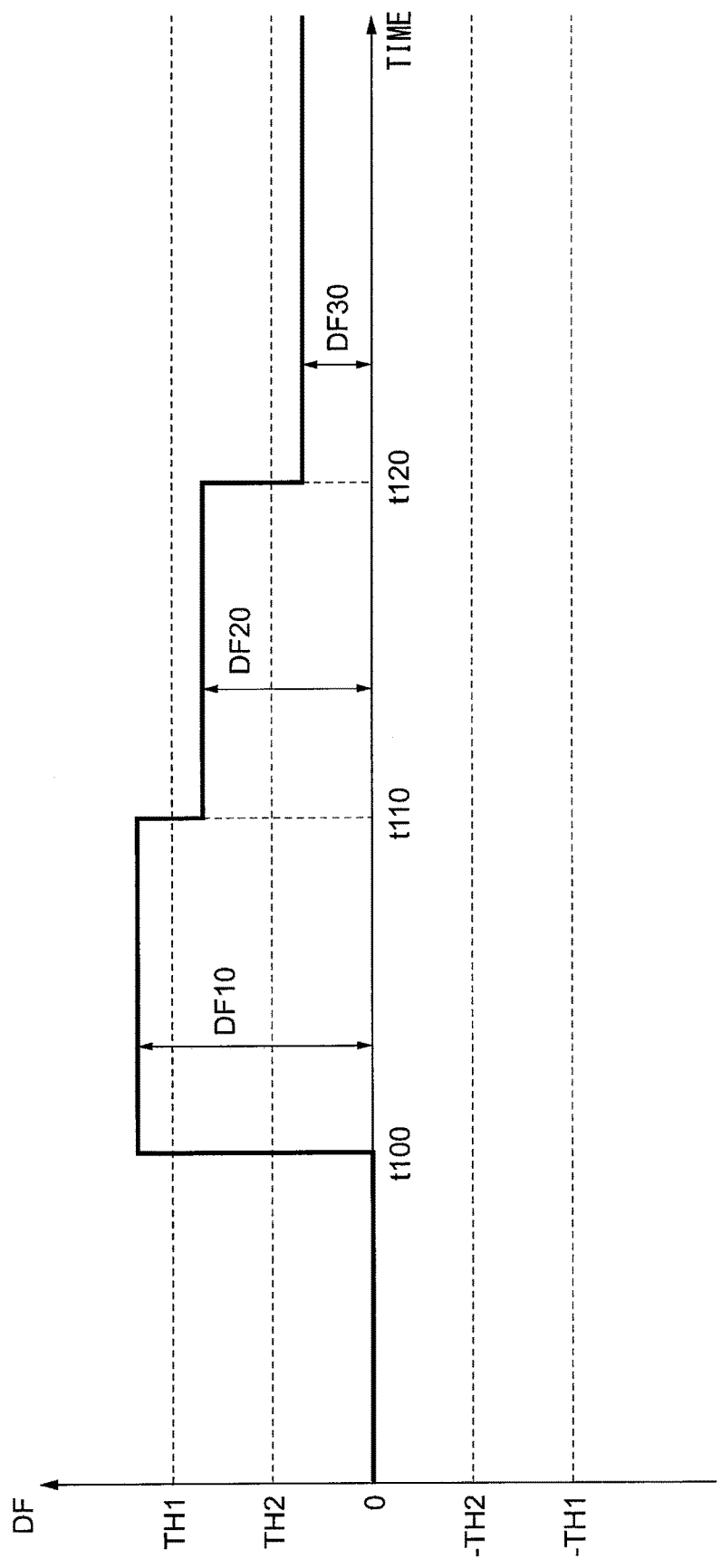
FIG. 6 shows a graph of a variance in current difference value.

The correction will now be described more specifically with reference to FIG. 6 and other related drawings. The calculator 210 calculates the current difference value DF each time the injector IJ injects fuel, and calculates an average value (for example, an average value in latest ten injections). FIG. 6 shows a change of an average value of the current difference values DF calculated in the manner as above.

In an example of FIG. 6, the actually-measured profile substantially coincides with the reference profile in a period up to a time point t100, and an average value of the current difference values DF calculated in such a period is substantially 0.

After the time point t100, the actually-measured profile (line G10) slopes more moderately than the reference profile (line G0) due to deterioration of the injector IJ or the like. That is, it is a state as shown in t FIG. 3A. Consequently, an average value of the current difference values DF calculated at and after the time point t100 takes a positive value (with a plus sign) and an absolute value is increased. In FIG. 6, a value DF10 is given as an average value of the current difference values DF at and after the time point t100.

In the present embodiment, a first threshold TH1 and a second threshold TH2 smaller than the first threshold TH1 are set in advance. The step-up target value is corrected to make the current difference value DF decrease when an average value (value DF10) of the current difference values DF exceeds the first threshold TH1.

Figure 4A:
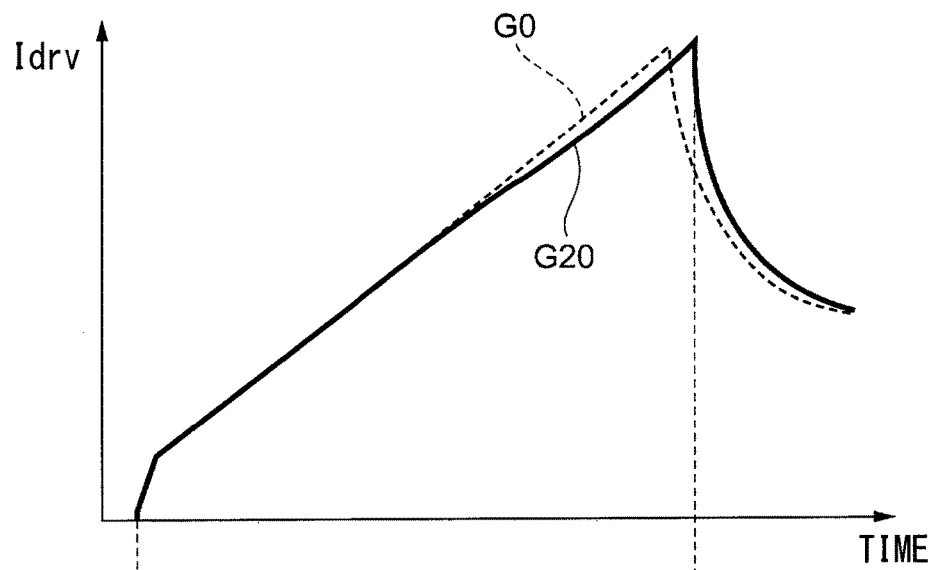
FIG. 4A to FIG. 4B show graphs of variances in drive current and drive voltage.
Figure 4B:
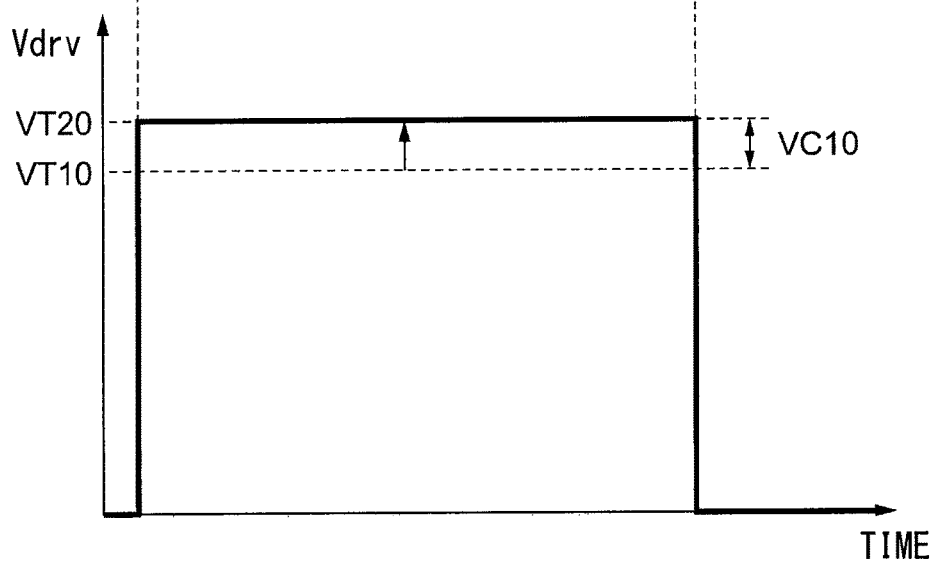

FIG. 4A and FIG. 4B show variations in drive current and drive voltage after the correction. As shown in FIG. 4B, the step-up target value is changed from the value VT10 to a value VT20 after the correction. The value VT20 is obtained by adding a correction amount (value VC10) to the value VT10. As will be described below, the correction amount (value VC10) used herein is set to a value adjusted corresponding to the current difference value DF.

Accordingly, a value of an actual drive voltage increases. As is shown in FIG. 4A, a gradient of a graph (line G20) of a variance in drive current is closer to the gradient of the line G0 compared with the gradient of the line G10 shown in FIG. 3A. That is, a difference between the actually-measured profile and the reference profile is reduced.

Consequently, as shown in FIG. 6, an average value of the current difference values DF decreases at and after a time point t110 when the correction is made. More specifically, the average value decreases to a value DF20 smaller than the value DF10 and the first threshold TH1.

Figure 5A:
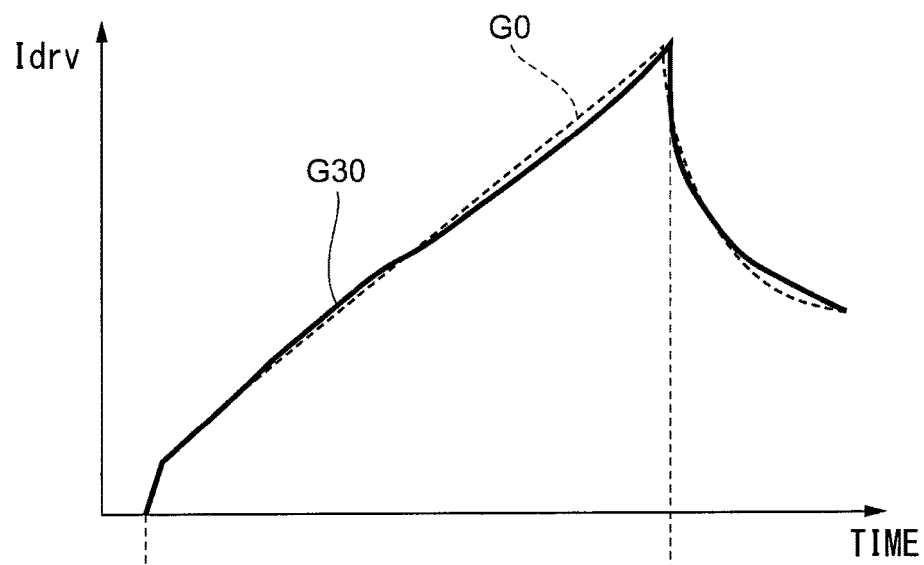
FIG. 5A to FIG. 5B show graphs of variances in drive current and drive voltage.
Figure 5B:
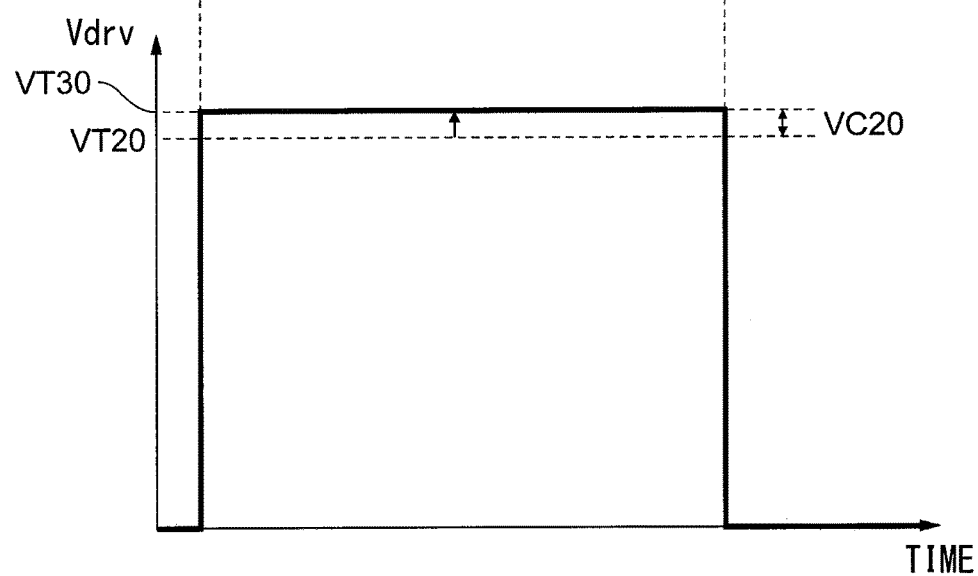

Even when the average value of the current difference values DF falls below the first threshold TH1, a correction of the step-up target value, that is, an addition of the correction amount to the step-up target value is continued. FIG. 5A and FIG. 5B show variances in drive current and drive voltage after the correction is made again. As is shown in FIG. 5B, the step-up target value is changed from the value VT20 to a value VT30 after the correction is made again. The value VT30 is obtained by adding a correction amount (value VC20) to the value VT20. The correction amount (value VC20) used herein is also set to a value adjusted corresponding to the current difference value DF.

Accordingly, a value of the actual drive voltage increases further. As is shown in FIG. 5A, a gradient of a graph (line G30) of a variance in drive current is closer to the gradient of the line G0 compared with the gradient of the line G20 in FIG. 4A. That is, a difference between the actually-measured profile and the reference profile is further reduced.

Consequently, as shown in FIG. 6, an average value of the current difference values DF decreases further at and after a time point t120 when the correction is made again. To be more specific, the average value decreases to a value DF30 smaller than the value DF20 and the second threshold TH2.

When the average value of the current difference values DF falls below the second threshold TH2, a correction (changing) of the step-up target value is ended. That is, fuel is injected repetitively from the injection IJ while the step-up target value is maintained at a present value (VT30). Hence, not only a final injection quantity of fuel, but also a time-variation in (profile of) injection quantity are brought into coincidence with the references. Consequently, fuel can be supplied to the internal combustion engine more appropriately.

The example shown in FIG. 3A through FIG. 6 is a case where the actually-measured profile before the correction slopes more moderately than the reference profile. Alternatively, the correction of the step-up target value described above is also available even in a case where the actually-measured profile before the correction slopes steeper than the reference profile, which will be described in the following with reference to FIG. 7A through FIG. 10.

Figure 10:
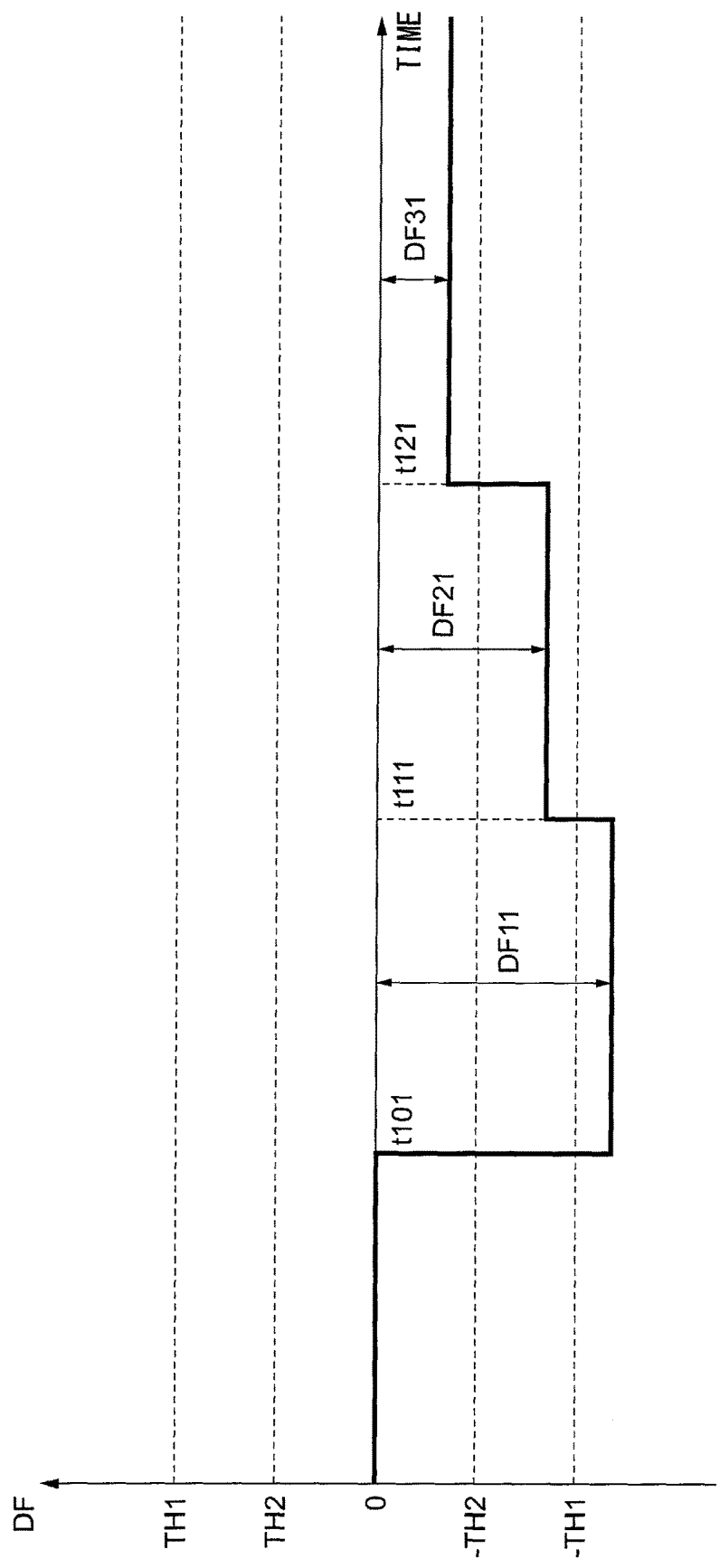
FIG. 10 shows a graph of a variance in current difference value.

Similar to FIG. 6, FIG. 10 shows a change of an average value of the current difference values DF calculated by the calculator 210. In an example of FIG. 10, too, the actually-measured profile substantially coincides with the reference profile in a period from the start to a time point t101, and an average value of the current difference values DF calculated in such a period is substantially equal to 0.

Figure 7A:
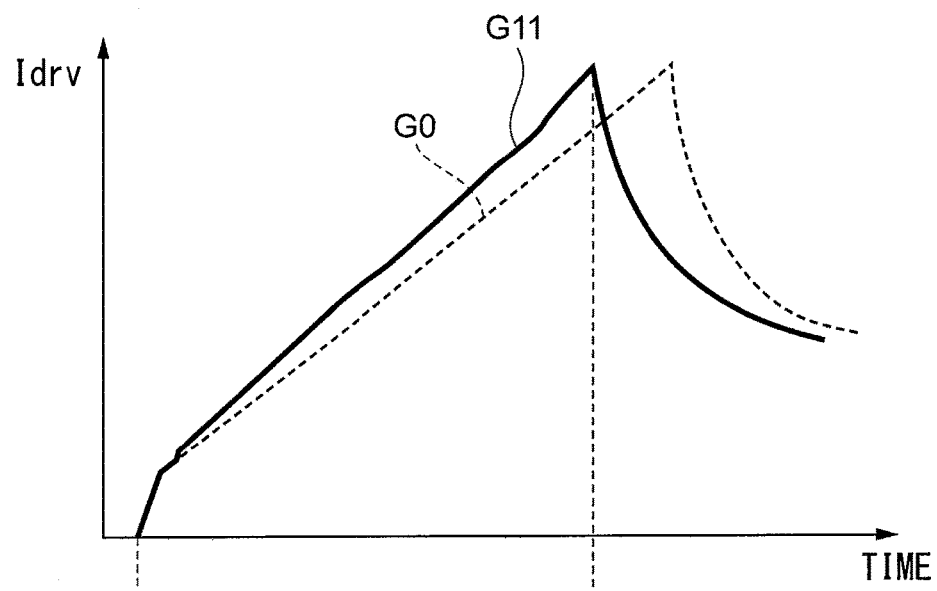
FIG. 7A to FIG. 7B show graphs of variances in drive current and drive voltage.
Figure 7B:
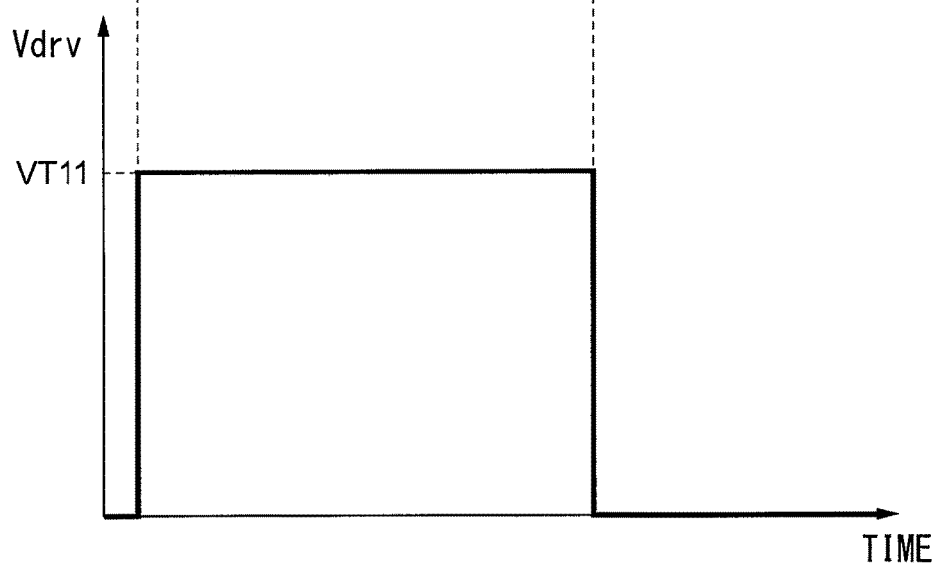

As is shown in FIG. 7A, after the time point t101, the actually-measured profile (line G11) slopes steeper than the reference profile (G0) due to deterioration of the injector IJ or the like. Consequently, the average value of the current difference values DF calculated at and after the time point t101 takes a negative value (with a minus sign), and an absolute value is increased. In FIG. 10, a value DF11 is given as an absolute value of the average value of the current difference values DF at and after the time point t101.

Even in such a case, too, the step-up target value is corrected to make the absolute value decrease when the absolute value (value DF11) of the average value of the current difference values DF exceeds the first threshold TH1.

Figure 8A:
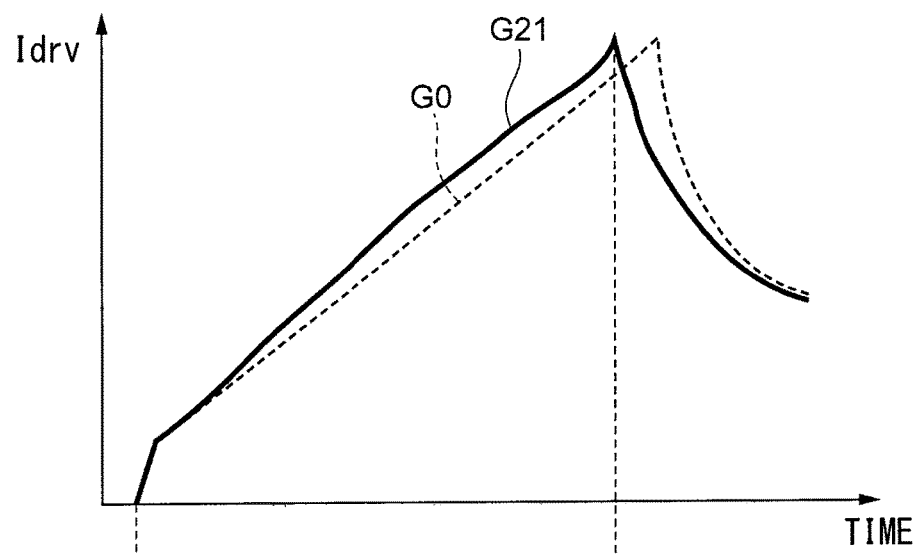
FIG. 8A to FIG. 8B show graphs of variances in drive current and drive voltage.
Figure 8B:
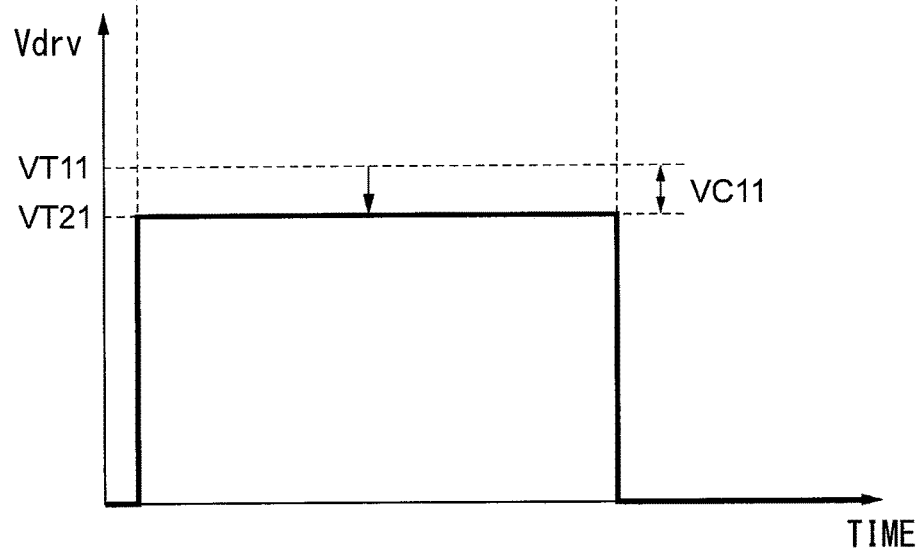

FIG. 8A and FIG. 8B show variations in drive current and drive voltage after the correction. As is shown in FIG. 8B, the step-up target value is changed from a value VT11 shown in FIG. 7B to a value VT21 after the correction. The value VT21 is obtained by subtracting a correction amount (value VC11) from the value VT11. The correction amount (value VC11) used herein is also set to a value adjusted corresponding to the current difference value DF.

In a case where the calculated average value of the current difference values DF takes a negative value as in the example above, the correction amount is subtracted from the step-up target value. It can be conversely said that the correction amount of a negative value is calculated and added to the correction amount.

Consequently, a value of the actual drive voltage is decreased. As shown in FIG. 8A, a gradient of a graph (line G21) of a variance in drive current is closer to the gradient of the line G0 than the gradient of the line G11 in FIG. 7A. That is, a difference between the actually-measured profile and the reference profile is reduced.

Consequently, as shown in FIG. 10, an absolute value of the average value of the current difference values DF decreases at and after a time point t111 when the correction is made. To be more specific, the absolute value of the average value decreases to a value DF21 smaller than the value DF11 and the first threshold TH1.

Figure 9A:
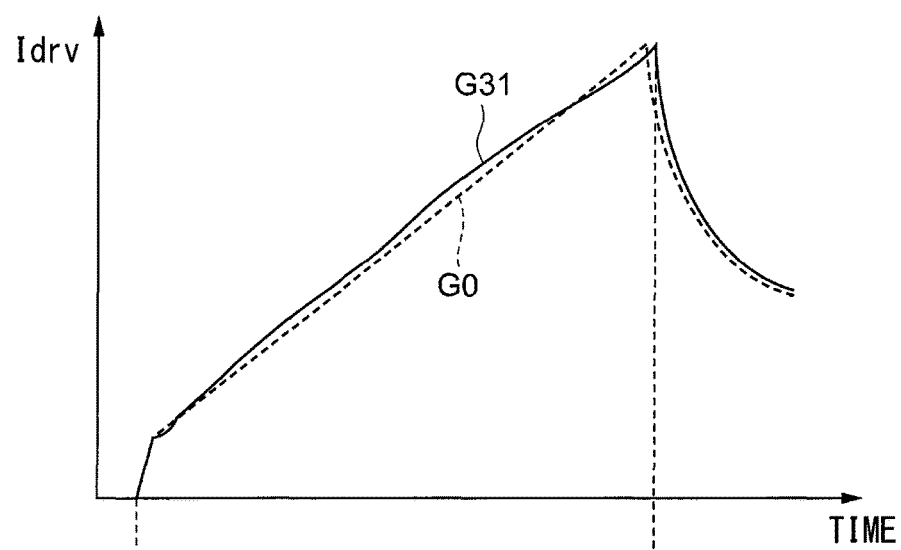
FIG. 9A to FIG. 9B show graphs of variances in drive current and drive voltage.
Figure 9B:
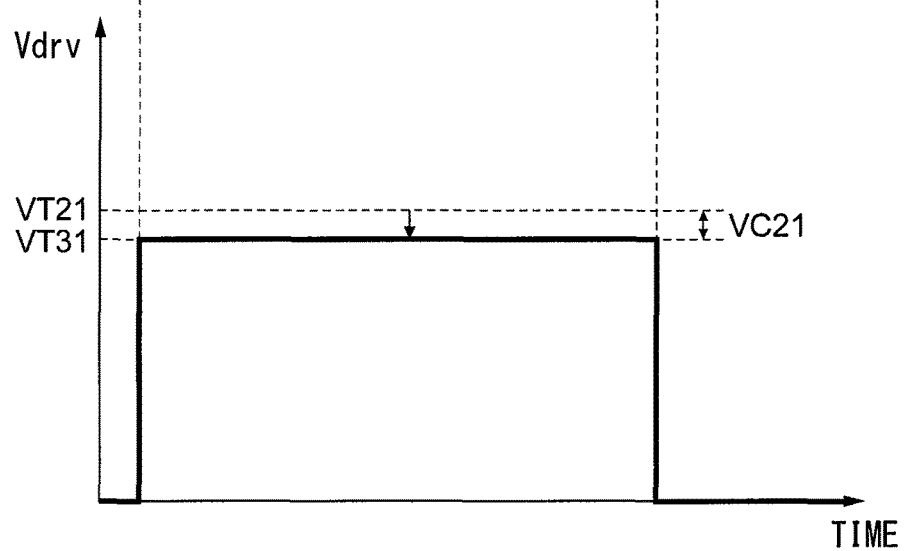

Even when an absolute value of the average value of the current difference values DF falls below the first threshold TH1, a correction of the step-up target value, that is, a subtraction of the correction amount from the step-up target value is continued. FIG. 9A and FIG. 9B show variances in drive current and drive voltage after the correction is made again. As is shown in FIG. 9B, the step-up target value is changed from the value VT21 to a value VT31 after the correction is made again. The value VT31 is obtained by subtracting a correction amount (value VC21) from the value VT21. The correction amount (value VC21) used herein is also set to a value adjusted corresponding to the current difference value DF.

Accordingly, a value of the actual drive current is further reduced. As is shown in FIG. 9A, a gradient of a graph (line G31) of a variance in drive current is further closer to the gradient of the line G0 than the gradient of the line G21 in FIG. 8A. That is, a difference between the actually-measured profile and the reference profile is further reduced.

Consequently, as shown in FIG. 10, an absolute value of the average value of the current difference values DF decreases further at and after a time point t121 when the correction is made again. To be more specific, the absolute value of the average value decreases to a value DF31 smaller than the value DF21 and the second threshold TH2.

When the absolute value of the average value of the current difference values DF falls below the second threshold TH2, a correction (changing) of the step-up target value is ended. That is, fuel is injected repetitively from the injector IJ while the step-up target value is maintained at a present value (VT31). In the example described above, too, not only a final injection quantity of fuel, but also a time-variation in (profile of) injection quantity is brought into coincidence with the references. Hence, fuel can be supplied to the internal combustion engine more appropriately.

The following will describe a concrete content of a process performed by the control apparatus 10 to correct the step-up target value as described above with reference to FIG. 11. A series of process steps shown in FIG. 11 is performed repetitively by the control apparatus 10 at predetermined intervals.

In a first step S01, whether a learning execution condition is satisfied is determined. The learning execution condition is preliminarily determined as a condition required to appropriately correct (learn) the step-up target value. In the present embodiment, it is determined that the learning execution condition is satisfied when a fluctuation of a load on the internal combustion engine falls within a predetermined range, that is, when an operating state of the internal combustion engine is relatively stable.

Figure 11:
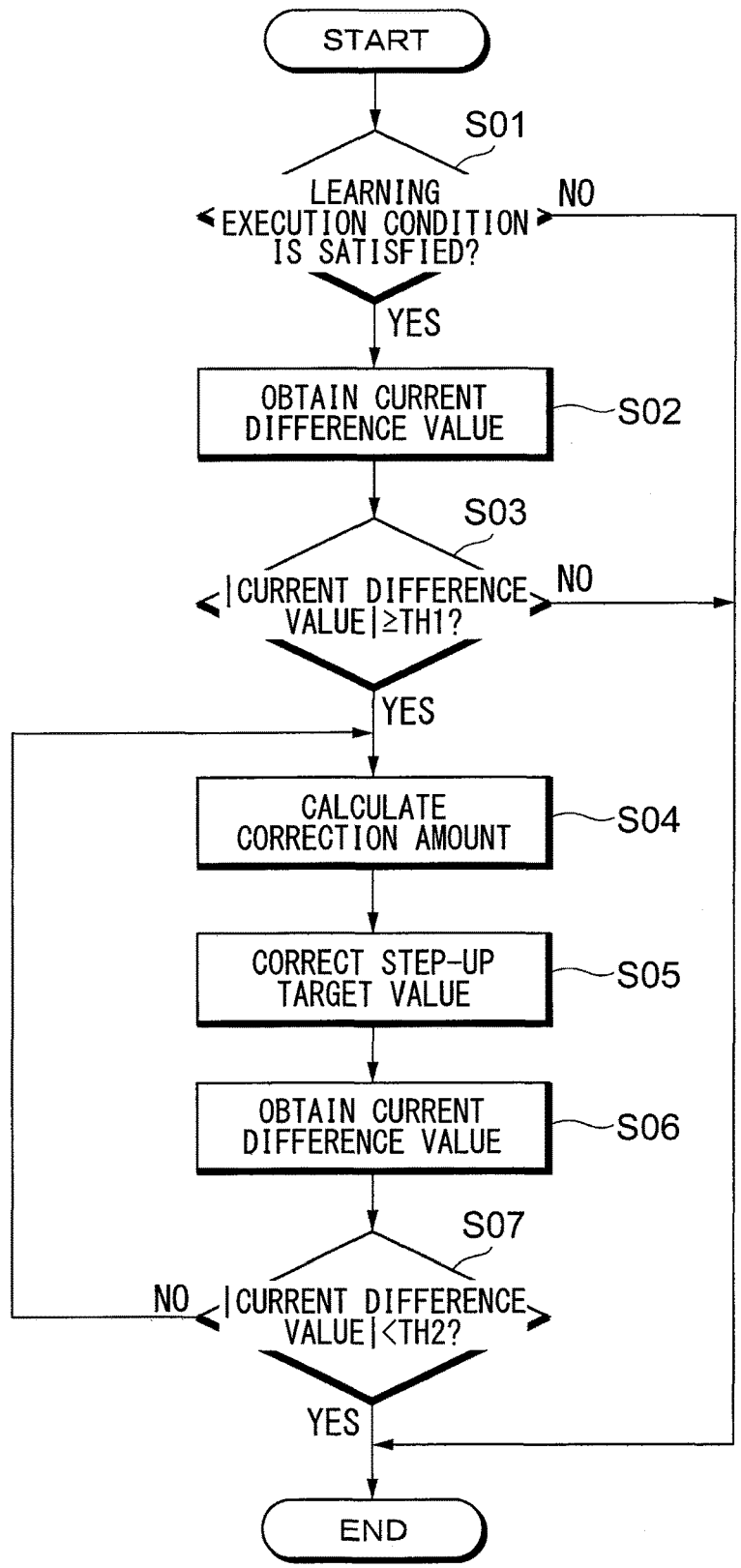
FIG. 11 is a flowchart depicting a process performed by the control apparatus shown in FIG. 1.

When the learning execution condition is not satisfied, a series of the process steps shown in FIG. 11 is ended without correcting the step-up target value. When the learning execution condition is satisfied, advancement is made to step S02.

In step S02, the calculator 110 of the controller 100 obtains an average value of the current difference values from the calculator 210. The calculator 110 obtains an average value of the current difference values at timing of step S02 while the calculator 210 calculates an average value of the current difference values constantly (each time fuel is injected from the injector IJ) and keeps updating the average value to a latest average value.

In step S03 following step S02, whether an absolute value of the average value of the current difference values is equal to or larger than the first threshold TH1 is determined by the calculator 110.

When the absolute value of the average value of the current difference values is smaller than the first threshold TH1, it means that the step-up target value does not need a correction. In this case, a series of the process steps shown in FIG. 11 is ended. When the absolute value of the average value of the current difference values is equal to or larger than the first threshold TH1, advancement is made to step S04.

In step S04, a value of a correction amount that needs to be added to the step-up target value is calculated. The correction amount is calculated corresponding to an absolute value of the current difference value by the calculator 110.

Figure 12:
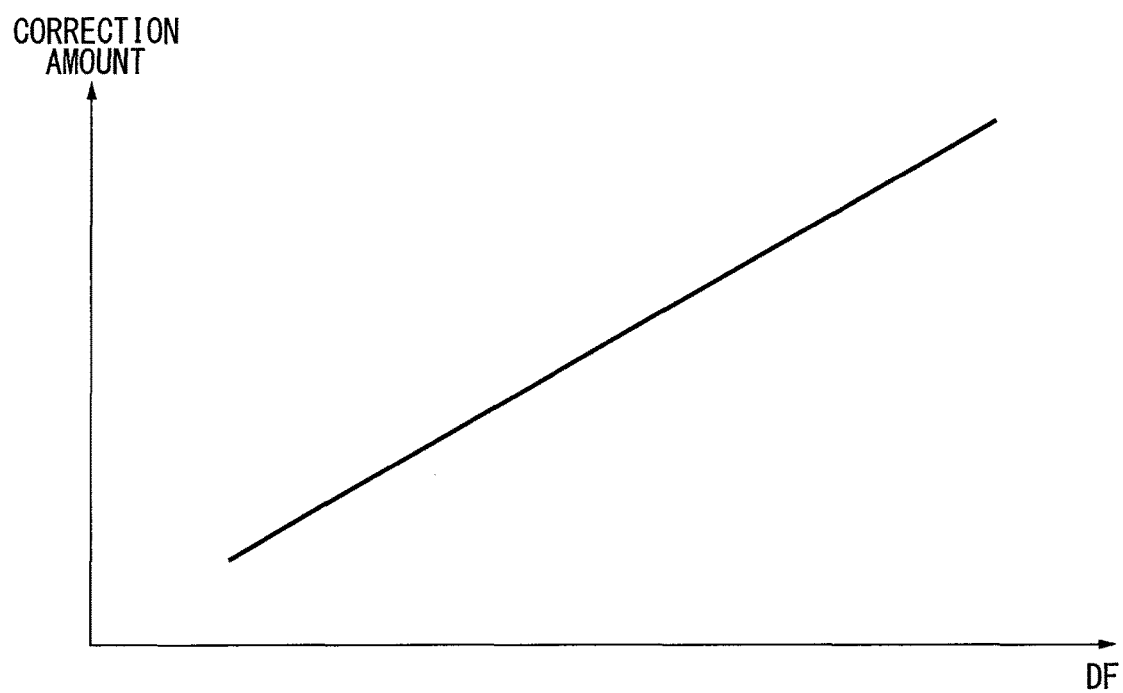
FIG. 12 shows a graph of a relationship between the current difference value and a correction amount set corresponding to the current difference value.

FIG. 12 is a graph of a relationship between the current difference value (abscissa) and a correction amount (ordinate) set corresponding to the current difference value. As shown in FIG. 12, an absolute value of the calculated correction amount increases as the absolute value of the current difference value increases. When the current difference value takes a negative value, the calculated correction amount takes a negative value, which is added to the step-up target value.

Referring to FIG. 11 again, the step-up target value is corrected in step S05 following step S04. In the present embodiment, the step-up target value is corrected by adding the calculated correction amount to the step-up target value as has been described above by the calculator 110. The corrected step-up target value is sent to the drive unit 200. The drive unit 200 controls an operation of the voltage application unit 300 for a value of the drive voltage to coincide with the received step-up target value.

Thereafter, a value of the drive current applied to the injector IJ varies with the correction. The current difference value also varies when a value of the drive current varies.

The above has described that the step-up target value is corrected by adding the calculated correction value to the step-up target value. Alternatively, the step-up target value may be corrected by multiplying the step-up target value by the correction value. For example, when the step-up target value is increased, a correction value larger than one may be calculated to multiply the step-up target value by the calculated correction value. When the step-up target value is decreased, a correction value smaller than one may be calculated to multiply the step-up target value by the calculated correction value.

In step S06 following step S05, as in step S02, an average value of the current difference values is obtained again from the calculator 210. It should be noted, however, that the average value of the current difference values obtained in step S06 is an actually-measured value reflecting the correction made in step S05.

In step S07 following step S06, whether an absolute value of the obtained average value of the current difference values is smaller than the second threshold TH2 is determined by the calculator 110.

When the absolute value of the average value of the current difference values is equal to or larger than the second threshold TH2, that is, in the case of the period from the time point t110 to the time point t120 of FIG. 6, the process in and after step S04 is performed again. The step-up target value is thus corrected again.

When it is determined in step S07 that the absolute value of the average value of the current difference values is smaller than the second threshold TH2, it means that the absolute value of the current difference value is sufficiently small and a correction of the step-up target value is no longer necessary. Hence, a series of the process steps shown in FIG. 11 is ended.

As has been described, according to the control apparatus 10 of the present embodiment, a gradient, that is, a change rate of a drive current is adjusted by correcting the step-up target value. The actually-measured profile is thus corrected close to the reference profile. Hence, instead of merely bringing a final injection quantity into coincidence with the target injection quantity, a time-variation in injection quantity in each fuel injection can be performed close to a reference time-variation. Consequently, fuel can be injected from the injector IJ more appropriately.

The embodiment of the present disclosure is not limited to the configuration described above, and can be modified in various manners. For example, a value obtained in step S02 and step S06 of FIG. 11 may be a (single) current difference value at a present time instead of an average value of the current difference values. In such a case, it is an absolute value of the current difference value that is compared with the threshold TH1 in step S03. Likewise, it is an absolute value of the current difference value that is compared with the threshold TH2 in step S07.

The current difference value may not be calculated by the calculator 210, and calculated by the calculator 110 of the controller 100 instead. In such a case, a waveform of the obtained drive current is transmitted from the calculator 210 to the calculator 110 so that the calculator 110 can calculate the current difference value according to the received waveform.

In the present embodiment, the current difference value is calculated based on a duration taken until a drive current reaches the threshold IT (see the FIG. 3A. Instead of this configuration, it may be configured in such a manner that the current difference value is obtained by, for example, subtracting a gradient of the graph representing the reference profile from a gradient of the graph representing the actually-measured profile.

While the embodiment of the present disclosure has been described with reference to a specific example, it should be appreciated, however, that the present disclosure is not limited to the specific example. That is, the specific example added with a design modification by anyone skilled in the art as needed is also within the scope of the present disclosure as long as the resulting specific example has characteristics of the present disclosure. For example, respective elements included in the specific examples described above, and locations, materials, conditions, shapes, and size of the elements are not limited to what have been described above and can be changed as needed. The respective elements of the embodiments described above can be combined where techniques permit, and such a combination is also within the scope of the present disclosure as long as the combination has the characteristics of the present disclosure.

The invention claimed is:

1. A control apparatus controlling an operation of an injector provided to an internal combustion engine, the control apparatus comprising:
   a voltage application unit applying a raised voltage that is a voltage raised to have a step-up target value to the injector to open the injector and applying a voltage lower than the raised voltage to the injector after applying the raised voltage;
   a current measurement unit measuring a drive current supplied to the injector in response to an application of the voltage; and
   a calculator calculating a current difference value which indicates a difference between a duration taken until the drive current exceeds the predetermined threshold from a time point when the raised voltage is started to be applied in an actually-measured profile and a duration taken until the drive current exceeds the predetermined threshold from a time point when the raised voltage is started to be applied in a reference profile, wherein the actually-measured profile indicates a time-variation in an actually-measured value of the drive current, and the reference profile is a profile set in advance,
   wherein the step-up target value is corrected according to the current difference value that is calculated.

2. The control apparatus according to claim 1, wherein:
   a first threshold and a second threshold smaller than the first threshold are set in advance;
   a correction of the step-up target value starts when an absolute value of the current difference value becomes equal to or larger than the first threshold value; and
   the correction of the step-up target value continues until the absolute value of the current difference value becomes smaller than the second threshold value.

3. The control apparatus according to claim 1, wherein:
   an absolute value of a correction amount for the step-up target value is set to be increased as the absolute value of the current difference value increases.

4. The control apparatus according to claim 1, wherein:
   a sign of the current difference value calculated when a gradient of the drive current in the actually-measured profile is larger than a gradient of the drive current in the reference profile is set to be different from a sign of the current difference value calculated when the gradient of the drive current in the actually-measured profile is smaller than the gradient of the drive current on the reference profile.

* * * * *